United States Patent [19]
Moreau et al.

[11] B 3,924,449
[45] Dec. 9, 1975

[54] OIL POLLUTION TOTALIZER

[75] Inventors: James O. Moreau, Morris Plains; Richard A. Halko, Flanders, both of N.J.

[73] Assignee: Exxon Research and Engineering Co., Linden, New Jersey

[22] Filed: June 13, 1973

[21] Appl. No.: 369,563

[44] Published under the Trial Voluntary Protest Program on January 28, 1975 as document no. B 369,563.

[52] U.S. Cl. ............................. 73/61.1 R; 73/195
[51] Int. Cl.² .................... G01F 1/00; G01N 1/20
[58] Field of Search ......... 73/61.1 R, 61 R, 195, 53; 324/61 R, 65 R; 356/36, 70; 250/301

[56] References Cited
UNITED STATES PATENTS

| | | | |
|---|---|---|---|
| 3,627,419 | 12/1971 | Thevenier | 356/36 |
| 3,638,476 | 2/1972 | Paterson | 73/61.1 R |

*Primary Examiner*—James J. Gill

[57] ABSTRACT

An oil pollution totalizer for accumulating all of the oil from a sample stream at a rate that is directly proportional to the rate of oil being discharged from the stream. The totalizer essentially comprises means for controlling the sample flow rate in proportion to the stream flow rate, means for removing the oil from the sample stream, and means for storing the oil for subsequent analysis.

8 Claims, 2 Drawing Figures

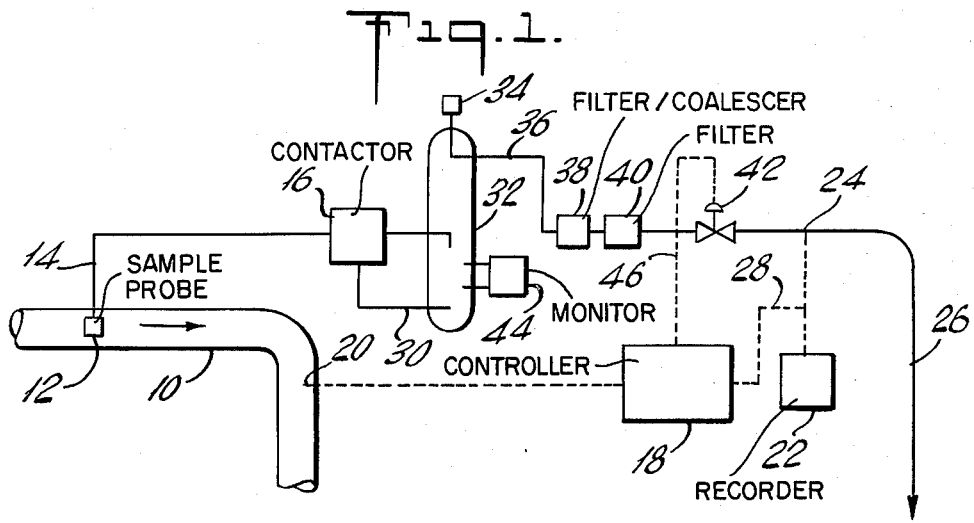
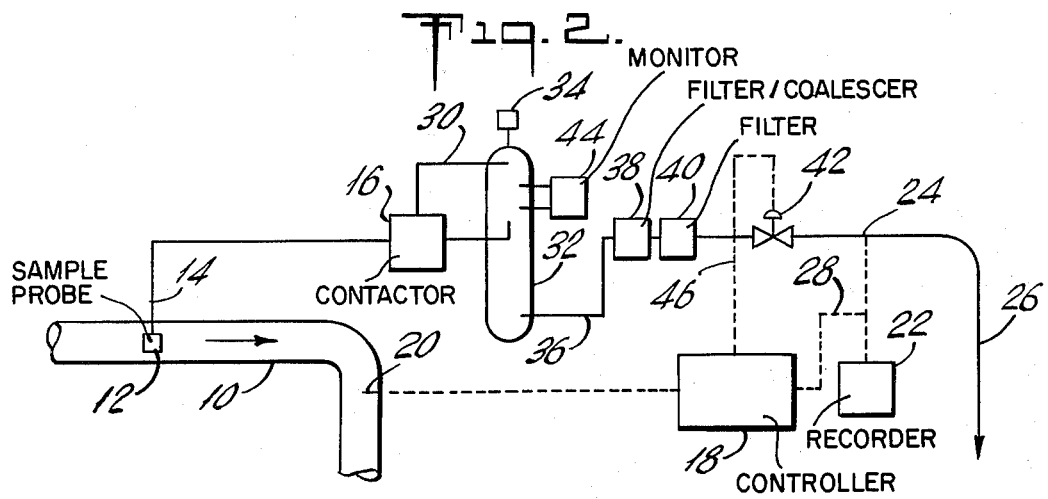

OIL POLLUTION TOTALIZER

BACKGROUND OF THE INVENTION

At present, international regulations limit the rate at which oil can be discharged into the ocean. Proposed regulations would further limit the total amount of oil that can be discharged by a ship at sea. Also, there is great emphasis at present for the amount of oil which can be discharged in the form of effluent from refinery processes on land. Existing devices are not capable of accurately measuring low level concentrations of oil in the discharge streams, nor can they determine the total amount of oil that has been discharged. There is a need for a device which has the capability of measuring both the rate and the total amount of oil discharged so that simpler techniques of oil measurement will be sufficient. Also, while proportional sampling devices are available, they are not able to effectively control low flow rates of a stream which contains oil and particulates and store the collected sample due to problems of evaporation, oxidation and biological degradation of the oil.

SUMMARY OF THE PRESENT INVENTION

The present invention overcomes the deficiencies of the prior art by providing a device which measure both the rate and total amount of oil discharged in a stream by integrating the low level oil concentration to a higher level. This invention further overcomes the prior art problems associated with controlling the sample flow rate and storing the oil sample for later analysis.

According to the present invention, an oil pollution totalizer is proved for accumulating all of the oil from a sample stream at a rate which is directly proportional to the rate of oil being discharged, e.g., in a stream from a tanker during a deballasting operation or in an effluent stream from a refinery operation. The totalizer comprises means for removing the oil from the sample stream and means for controlling the sample flow rate in porportion to the stream flow rate, and then finally, means for storing the oil for analysis such as by a continuous oil monitoring device or by standard laboratory techniques.

Accordingly, it is a primary object of the present invention to provide a device for measuring both the rate and total amount of oil discharged during a particular operation.

A further object of the present invention is to provide a device which measures the rate and total amount of oil discharged by integrating the low level oil concentrations to a higher level.

Having in mind the above and other objects and advantages that will be apparent from an understanding of this disclosure, the present invention comprises the construction and arrangement as illustrated in the presently preferred embodiment of this invention which is hereinafter set forth in such details as to enable those skilled in the art readily to understand the function, operation, construction and advantages of it when read in conjunction with the accompanying drawing.

BRIEF DESCRIPTION OF THE DRAWINGS

FIG. 1 is a schematic illustration of an oil pollution totalizer according to the present invention, employing a heavier-than-water solvent; and FIG. 2 is a schematic illustration of an alternate embodiment of the invention, employing a lighter-than-water solvent.

DESCRIPTION OF THE PREFERRED EMBODIMENTS

Having reference to the drawings wherein like parts are designated by the same reference numeral, the present invention is illustrated in the two figures in opreable association with a typical discharge line 10, such as may be found on a tanker or as the output for a refinery effluent stream. In both situations there is a need to limit the rate and total amount of oil. As shown, the arrows illustrate the direction of flow of the discharge stream. Between the inlet (not shown) to the pipe 10 and its outlet (not shown), and preferably at a location such as a tanker pumproom or a turbulent portion of a refinery effluent stream, there is provided suitable means 12 for continuously withdrawing an oily water sample of a predetermined amount from the flow stream. This sample tap typically may comprise a standard probe such as described in API RP 550, second edition, dated May, 1965, page 11. For use on a refinery effluent stream, a pump may be required to propel the sample through the totalizer system. The amount of sample used then is conveyed via a conduit 14 into a solvent/sample contacting means 16, the function and construction of which will be described in detail hereinafter. There also is provided a flow controller 18 connected downstream of where the sample is taken. This controller typically may comprise a pneumatic ratio controller with recorder which operates to regulate the flow rate in the sample outlet line 26 as a predetermined fixed relation of the discharge flow rate. The controller is connected through a sensor 20 into the flowing discharge stream for sensing the rate of discharge. A flow recorder 22, which may comprise a conventional pneumatic chart recorder, is connected to the outlet line 26 by sensor 24 for measuring the sample flow rate for comparison purposes with the sensed discharge flow rate 20 by connection 28.

The contactor 16 typically may comprise equipment such as a pump, a static mixer, an ultrasonic mixer, and the like, so long as it is capable of mixing and providing an intimate contact between the oily water sample taken from the discharge stream and the solvent (which may comprise a solvent compatible with the subsequent analysis for oil concentration, such as carbon tetrachloride with analysis by infrared adsorption) which flows through the line 30. The solvent extracts the oil from the sample so that the water will form a separate phase. The mixture of solvent and sample passes from the contactor into a conventional settling chamber 32, such as a section of cylindrical pipe. This chamber may be provided with an automatic air release 34 for eliminating any entrapped air in the chamber which might be caused by air entrained in the discharge line 10 and otherwise result in transient surges in sample flow rate. The chamber 32 separates the solvent with the oil from the combined solvent/sample mixture. The solvent with oil is then recycled to flow back through the line 30 to the contactor means 16 where the process is repeated. At the end of the chamber opposite from the solvent/oil recycle outlet, the clean water exits via the conduit 36 and passes through an optional means 38 for removing contaminants. This apparatus 38 may comprise a filter-coalescer for removing and retaining solid particulates, entrained solvent, etc. The stream then passes through a filter medium 40 which removes particulates and provides an additional filter medium to that provided by the filter-coalescer 38. The contactor 16 provides the necessary mixing and intimate contacting between the recycled solvent and the sample for total extraction of the oil. By pumping this solvent/sample mixture into the settling chamber, the solvent containing the extracted oil separates from the water. If a heavier-than-water solvent is used as shown in the preferred illustrated embodiment of FIG. 1, the solvent plus oil settles to the bottom and is recycled, while the clean oil-free sample water flows out from the top of the chamber. However, if a lighter-than-water solvent were to be used, then the solvent anad water flow paths would be as shown in the alternative illustrated embodiment of FIG. 2. The clean water without solvent, oil or particulates then passes through the sample flow rate control valve 42 which is connected by line 46 to the controller 18. The control valve 42 is continuously controlled as a function of flow rate in the discharge line 10. Thus, valve 42 is variable in that it controls sample flow in line 26 directly porportional to flow in line 10. For example, a maximum flow in line 10 will result in a maximum sample flow in line 26 in accordance with a predetermined relationship as established by the controller 18. The sample flow rate sensor 24 and the sample flow rate control valve 42 operate (i.e., they control) sample flow at a point of clean water on the sample after the solvent, oil and particulates have been removed. This technique enables accurate control of the low sample flow rate through the totalizer. Sensor 24 senses the sample flow rate in line 26. Signals from sensors 20 and 24 are sent to controller 18, which in turn controls throttling of valve 42. The sensor 24 may be omitted and controller 18 set to throttle valve 42 in a predetermined pattern as a function of sensed flow in line 10.

The total oil extracted from the sample is retained in the constant volume of recirculated solvent so that the oil concentration in the solvent is directly porportional to the total oil discharged in the ballast water or effluent stream. This occurs because the sample in the totalizer system is controlled by valve 42 to be directly porportional to the oily water discharged in line 10. The total oil in the sample is therefore proportional to the total oil in the discharge line. Since all the oil from the sample stream is retained in the fixed volume of solvent, the oil concentration in the solvent is directly porportional to the total oil discharged through line 10. Thus, the total oil discharged during a selected time interval, such as a tanker ballast voyage, could be determined by removing the solvent from the totalizer system and analyzing the oil concentration by standard laboratory techniques such as infrared adsorption. If desired, a suitable device for continuously monitoring the oil concentration in the solvent may be provided as shown at 44. This will provide information about the rate of oil pollution, since the time rate of change in the concentration of oil in the constant volume of solvent is directly proportional to the time rate of oil discharged through line 10. A typical monitoring device (not shown) may comprise an infrared adsorption monitor equipped with a flow-through cell. The oil removed from the sample stream is retained in solution with the solvent. This technique not only facilitates analysis of oil concentrations, but even more important, it prevents changes in oil composition such as would be caused by evaporation, oxidation or biological degradation if the oily water were stored as such in a drum.

Thus, this novel technique enables accurate measurements of the total oil discharged. By removing the oil from the water and storing it in a solvent phase, a separate extraction step is not required for subsequent analysis of the sample.

This arrangement also provides an excellent pollution control system, since the totalizer per se can be placed in a tamper-proof locked case so that the pollution control authority then can board a tanker in the port or go through a refinery and obtain detailed information about the total amount of oil pollution over any desired interval of time. The unit, when in a tamper-proof locked casing, could be an invaluable tool for the tanker or refinery operator by providing proof there was no violation of total oil limitations in the discharge. The totalizer system (excluding the concentration monitor 44) could be so constructed as to use only pneumatically powered components, so that the entire system would be intrinsically safe. This capability would permit installation of the totalizer system in a hazardous location such as a tanker pump room, if such a location were desirable.

It will be appreciated from the foregoing that there has been disclosed a novel and improved device for obtaining data on the total amount of oil discharged in a stream. However, it should be understood that the construction, arrangement, and combination of parts therein illustrated and described is intended to be representative of only a preferred embodiment, and that certain changes readily may be made therein without departing from the clear teachings and scope of the present invention. Accordingly, reference should be made to the following appended claims in determining the full scope of coverage afforded by this invention.

Having thus set forth the nature of this invention, what we claim herein is:

1. A system for determining the rate and total amount of oil discharged in a flowing discharge stream comprising, means for removing a predetermined sample of said flowing discharge stream; contactor means for intimately mixing said sample with a predetermined volume of solvent; chamber means for receiving and processing the intimately mixed sample and solvent to form a separable first oil-solvent phase and a second phase which is relatively clean; means for recycling the first oil-solvent phase through said contactor means; and outlet means for discharging said relatively clean second phase from said chamber means to an outlet line; flow rate control means operably connected in said outlet line; and means connected for sensing the relative flow rates of said relatively clean second phase and said flowing discharge stream and controlling said flow rate control means such that the flow rate of said relatively clean second phase is maintained in predetermined direct relation to the flowing discharge stream.

2. The system according to claim 1, wherein the controller means is connected for sensing the discharge stream downstream from the location at which said sample is taken.

3. A system according to claim 1, wherein the controller means is operably connected through sensors for sensing the flow rate of the discharge stream and said second phase.

4. A system according to claim 1, including filter means connected with said outlet means from said chamber means for removing particulate matter, entrained solvent and the like, from said second phase exiting therefrom.

5. A system according to claim 1, wherein said flow control means comprises a valve connected for controlling the discharge flow rate of second phase.

6. A method of measuring the rate and total amount of oil contained in flowing discharge stream comprising the steps of:
   a. withdrawing a predetermined sample from said discharge stream;
   b. contacting said sample with a predetermined constant volume of solvent in a contactor to form a mixed stream;
   c. separating by gravity in a chamber said mixed stream into a first oil-solvent phase and a second phase relatively free of oil;
   d. recycling said first oil-solvent phase through said contactor; and
   e. discharging said second phase from said chamber through an outlet line at a rate which is directly proportional to the flow rate of said flowing discharge stream.

7. The method of claim 6, including the step of:
   f. filtering the second phase of said mixed stream subsequent to removal of the oil-solvent phase therefrom.

8. The method of claim 7, including the step of:
   g. regulating the rate of flow of said second phase of said mixed stream after filtering has been accomplished.

* * * * *